C. EWING.

COLLAR STUFFING MACHINE.

No. 11,052. Reissued Dec. 31, 1889.

Witnesses,
Geo. H. Strong.
J. P. House

Inventor,
Calvin Ewing
By Dewey & Co.
Attys

N. PETERS, Photo-Lithographer, Washington, D. C.

UNITED STATES PATENT OFFICE.

CALVIN EWING, OF SAN FRANCISCO, CALIFORNIA.

COLLAR-STUFFING MACHINE.

SPECIFICATION forming part of Reissued Letters Patent No. 11,052, dated December 31, 1889.

Original No. 405,023, dated June 11, 1889. Application for reissue filed September 20, 1889. Serial No. 324,568.

*To all whom it may concern:*

Be it known that I, CALVIN EWING, a citizen of the United States, residing in the city and county of San Francisco, and State of California, have invented a new and useful Collar-Stuffing Machine, of which the following is a specification.

My invention relates to improvements in machinery for stuffing horse-collars, which will be understood by reference to the accompanying drawings and the letters referring thereto.

Figure 1:
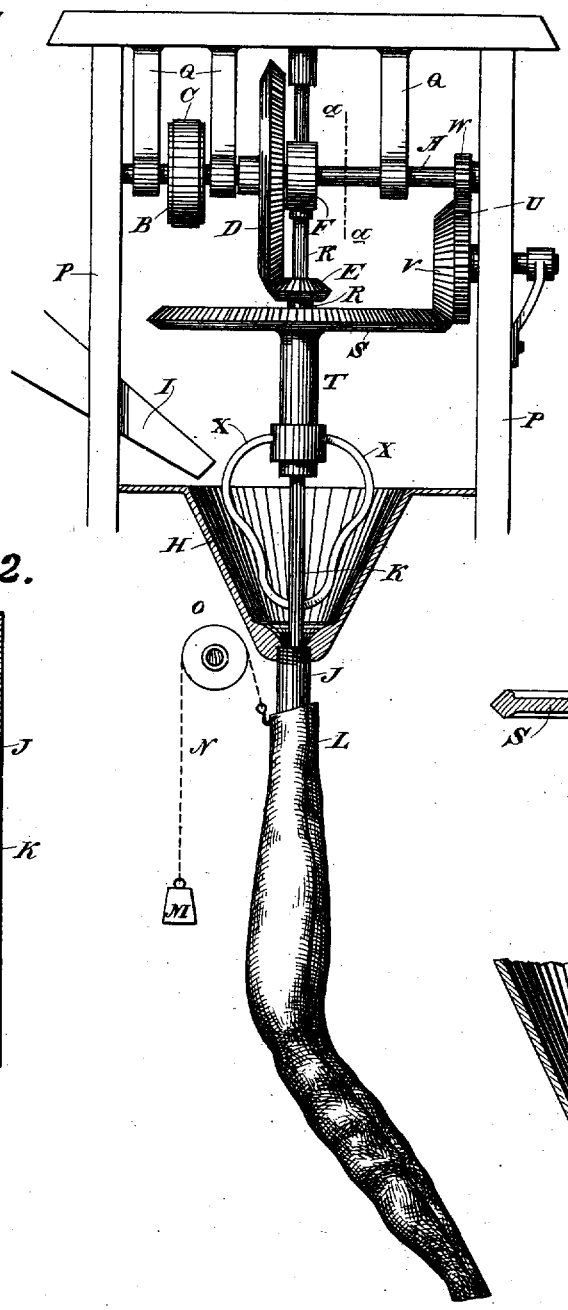
Figure 4:
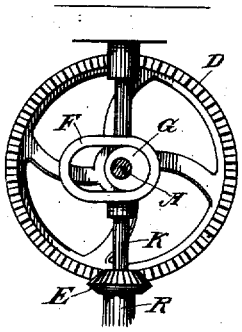
Figure 2:
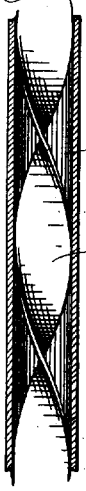
Figure 2:
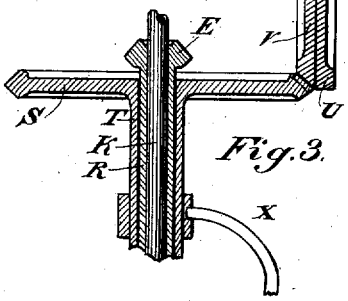
Figure 3:
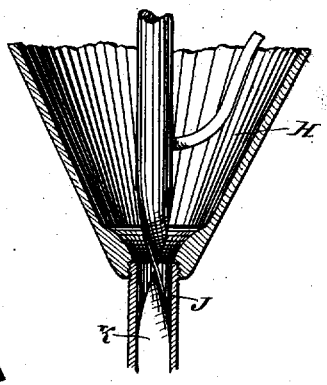

Figure 1 is an elevation showing the general construction and arrangement of the machine. Fig. 2 is a full-sized broken view of the stuffing-tube and spiral stuffing-rod; Fig. 3, a broken sectional view of the lower end of the feed-hopper, showing the attachment of the stuffing-tube, the spiral stuffing-rod, and the inclined arm of the stirrer; Fig. 4, a broken sectional view cut through the dotted lines *a a*.

A represents the main driving-shaft; B, the main driving-pulley; C, the belt; D, the main driving bevel-wheel; E, the pinion which drives the spiral stuffing-rod; F, the stuffing-cam yoke; G, the eccentric or cam for operating the stuffing-rod; H, the feed-hopper; I, the supply-trough; J, the stuffing-tube; K, the stuffing-rod; L, the horse-collar partly stuffed; M, the tension-weight; N, the tension-cord; O, the training-pulley for the cord N to pass over.

P represents the main frame, to which the machine is attached.

Q represents the hangers which support the main shaft.

R represents the sleeve which revolves the spiral stuffing-rod K, and is itself revolved by means of the pinion E. The wheel S is revolved by the pinions U and V, which are in turn revolved by the pinion W. The stirrer X is attached to the sleeve T.

The following is the construction of my improved collar-stuffing machine: I attach the hopper H to the frame P and screw the stuffing-tube J into the bottom of the same, and pass the stuffing-rod K through the same. The top of the stuffing-rod K passes into the sleeve R, which is attached to the yoke by means of a swivel-joint. The wheel S is attached to the sleeve T, which carries the stirrer X. The stirrer X is bent back spirally, so as to press the cut straw or stuffing down to the tube J. I hang the shaft A by means of the hanger Q to any suitable frame P at the required elevation to allow the machinery to be placed high enough to hang and stuff the collar below the end of the tube J. I place any required number of the stirrers X upon the sleeve T, although two are generally found sufficient to keep the straw or flock pressed down to the tube J as fast as the spiral feed-rod K requires it. I hook the collar L upon the end of the tension-cord N, and by varying the size of the weight M, I regulate the tension, thereby regulating the density or compactness of the collar-stuffing.

The following is the operation of stuffing collars by my improved collar-stuffing machine: The cut straw, flock, or other suitable collar-stuffing material is supplied to the feed-hopper H. The main shaft A being revolved, the wheel D is revolved, giving motion to the pinion E, consequently revolving the stuffing-rod K. The pinion E is attached by means of a feather, so as to allow the rod to slide up and down at each revolution of the shaft A. The cam G at each revolution of the shaft A raises and lowers the yoke F, carrying the stuffing-rod K up and down and tamping the filling or stuffing material in the collar. Meanwhile the pinion E is rapidly revolved, revolving the stuffing-rod K and carrying the straw or other material through the tube J into the collar L. The weight M draws the collar L up with the desired pressure to regulate the force of the tamping and packing of the stuffing in the collar.

By various weights the stuffing may be correspondingly regulated to give any required solidity to the collar.

Having thus described my invention in horse-collar-stuffing machines, what I claim is—

1. A machine for packing or stuffing collars, consisting of a hopper or receiver having a tubular extension from its lower end, upon which the collar is fitted, in combination with an auger having a combined rotary and reciprocating motion within the hopper and tubular extension, substantially as described.

2. In a collar-stuffing machine, the receiver or hopper with the extension-tube from the bottom, the vertically-reciprocating auger, and mechanism whereby it is actuated, in combination with the frame or agitator hinged within the hopper, and the crank or eccentric whereby it is agitated, substantially as described.

3. In combination with the tube J and spiral stuffing-rod K, the cam G and yoke F, connected, constructed, and operated substantially as and for the purposes set forth.

4. The combination and arrangement of the stuffing-tube J, the stuffing-rod K, the feed-box H, the stirrers X, the sleeve T, the wheel S, the wheels U and V and pinion W, the main driving-shaft A, the wheel D, the cam G and yoke F, the pinion E, the weight M, the cord N, and sheave O, constructed and operated substantially as and for the purposes set forth.

In witness whereof I have hereunto set my hand.

CALVIN EWING.

Witnesses:
S. H. NOURSE,
WILLIAM W. SESSIONS.